(12) United States Patent
Yoshida et al.

(10) Patent No.: US 6,319,167 B1
(45) Date of Patent: Nov. 20, 2001

(54) TRANSMISSION CONTROL SYSTEM

(75) Inventors: Yoshiyuki Yoshida; Toshio Hori, both of Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/526,478

(22) Filed: Mar. 15, 2000

(30) Foreign Application Priority Data

May 27, 1999 (JP) .................................................. 11-148616

(51) Int. Cl.⁷ .................................................. B60K 6/02
(52) U.S. Cl. .................................................. 477/5; 477/20
(58) Field of Search ................................. 477/3, 5, 6, 20, 477/107

(56) References Cited

U.S. PATENT DOCUMENTS

| | | | |
|---|---|---|---|
| 5,833,570 | * 10/1998 | Tabata et al. | 477/3 |
| 5,993,350 | * 10/1999 | Lawrie et al. | 477/5 |
| 6,176,808 | * 1/2001 | Brown et al. | 477/3 |

FOREIGN PATENT DOCUMENTS 0 658 698   6/1995 (EP) .
7-197955   8/1995 (JP) .

* cited by examiner

*Primary Examiner*—Sherry Estremsky
(74) *Attorney, Agent, or Firm*—Crowell & Moring LLP

(57) ABSTRACT

A transmission control system can reduce degradation of engine characteristics upon shifting operation and can reduce a load on the side of a clutch and a transmission due to delay of response. The transmission control system includes an engine generating a driving force, a transmission having a plurality of gear positions for transmitting the driving force developed by the engine to driving wheels, a clutch for connecting said engine and said transmission, engine control means for controlling the engine, transmission control unit for switching gear positions of the transmission, and clutch control unit for controlling disengagement and engagement of the clutch. The transmission control system further includes an electric motor connected to a drive shaft of the engine and capable of performing regenerating operation, and motor control unit for controlling said electric motor for driving the electric motor for generating a driving force or for performing regenerating operation. The motor control unit transmits said driving force to the driving wheel upon shifting operation by the transmission and performs regenerating portion by an energy from the driving wheels.

5 Claims, 12 Drawing Sheets

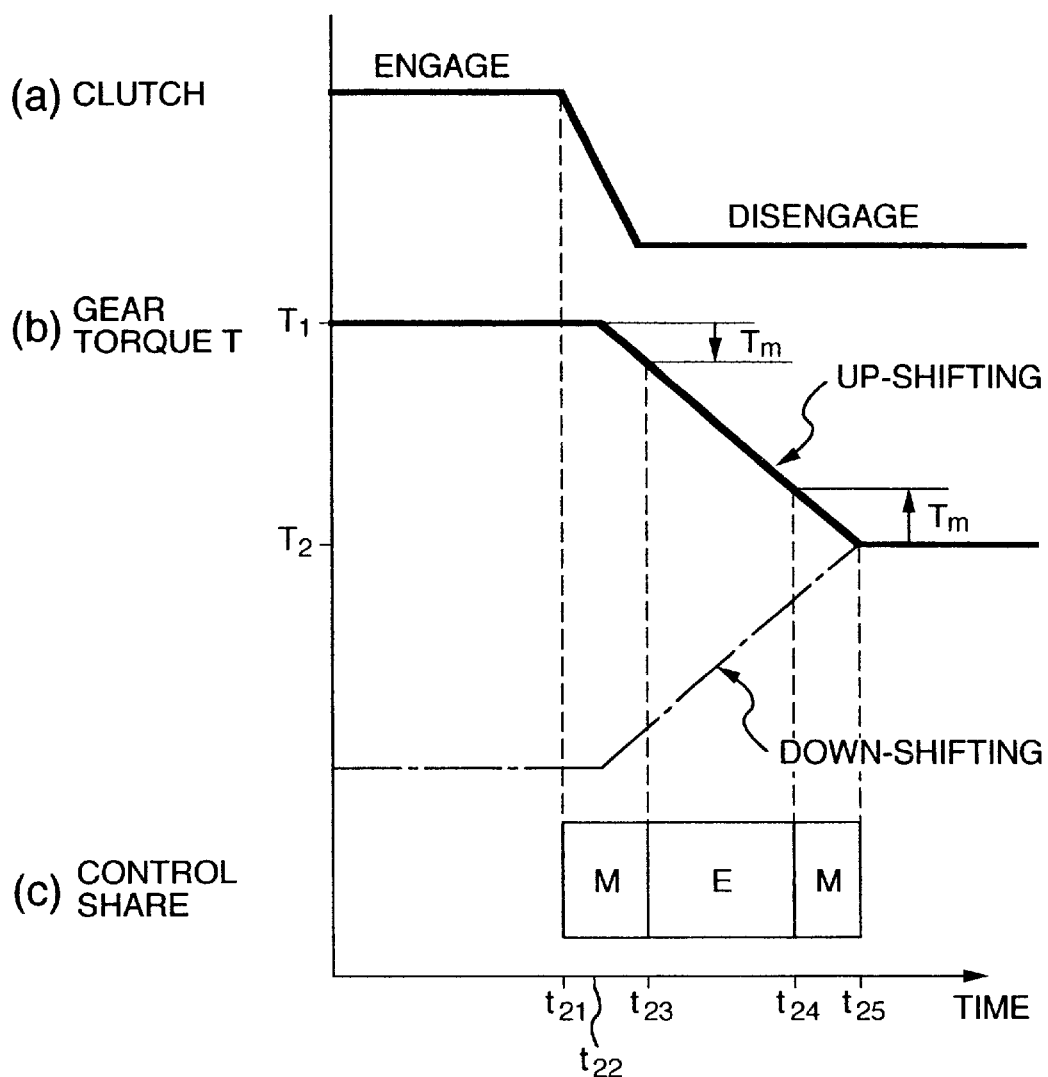

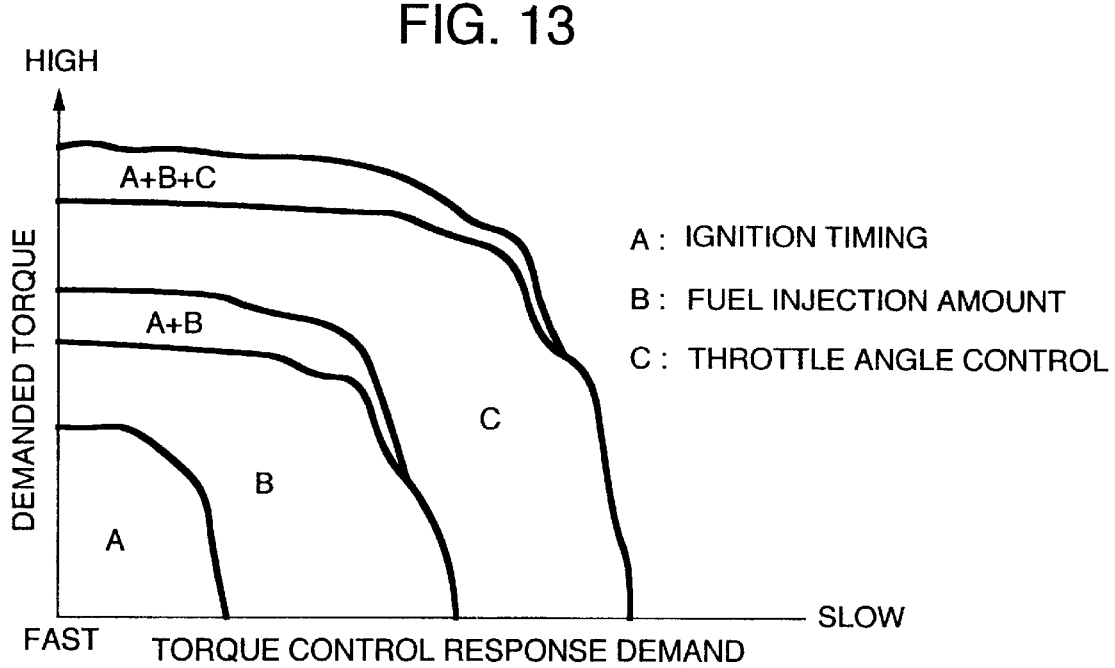

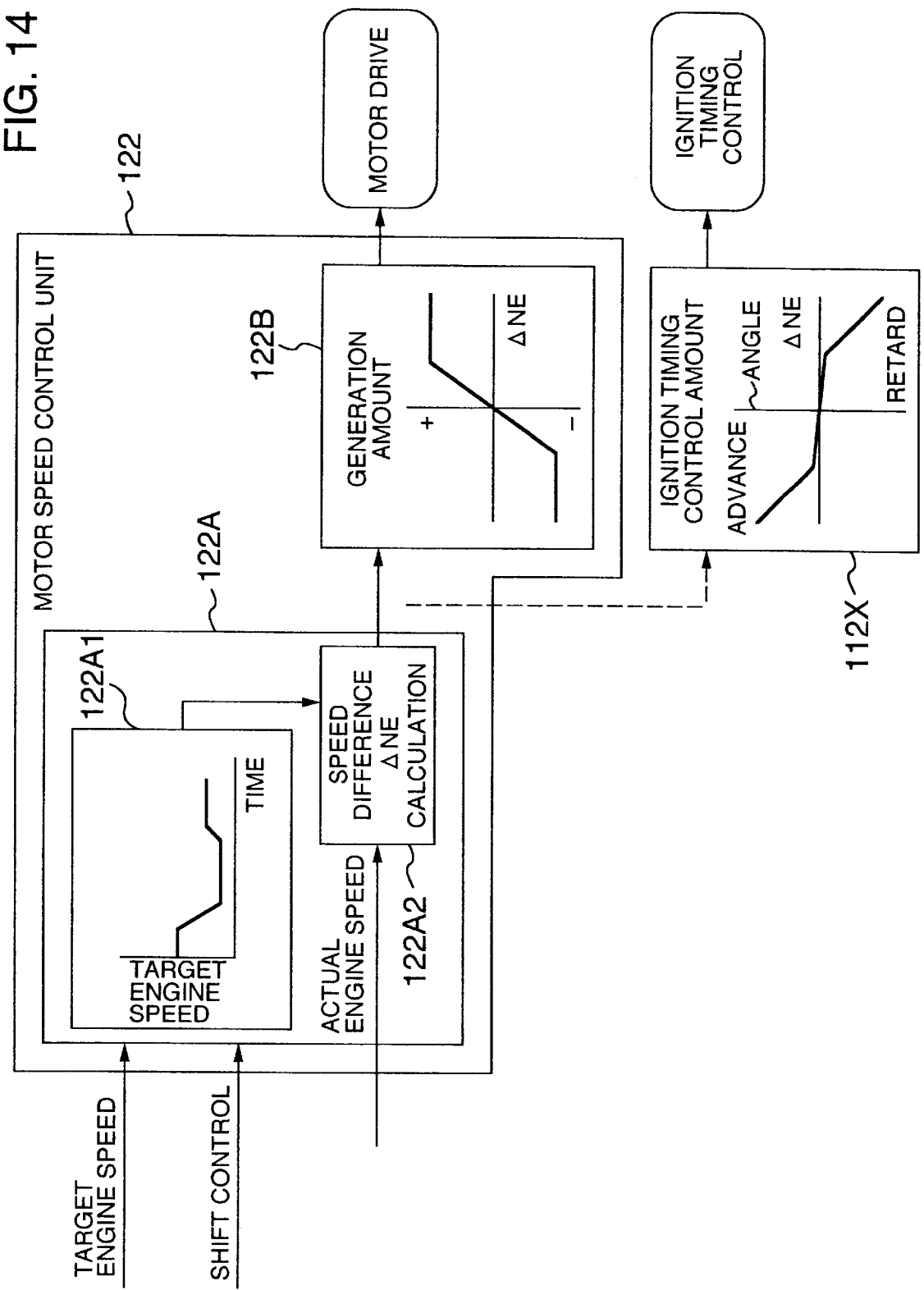

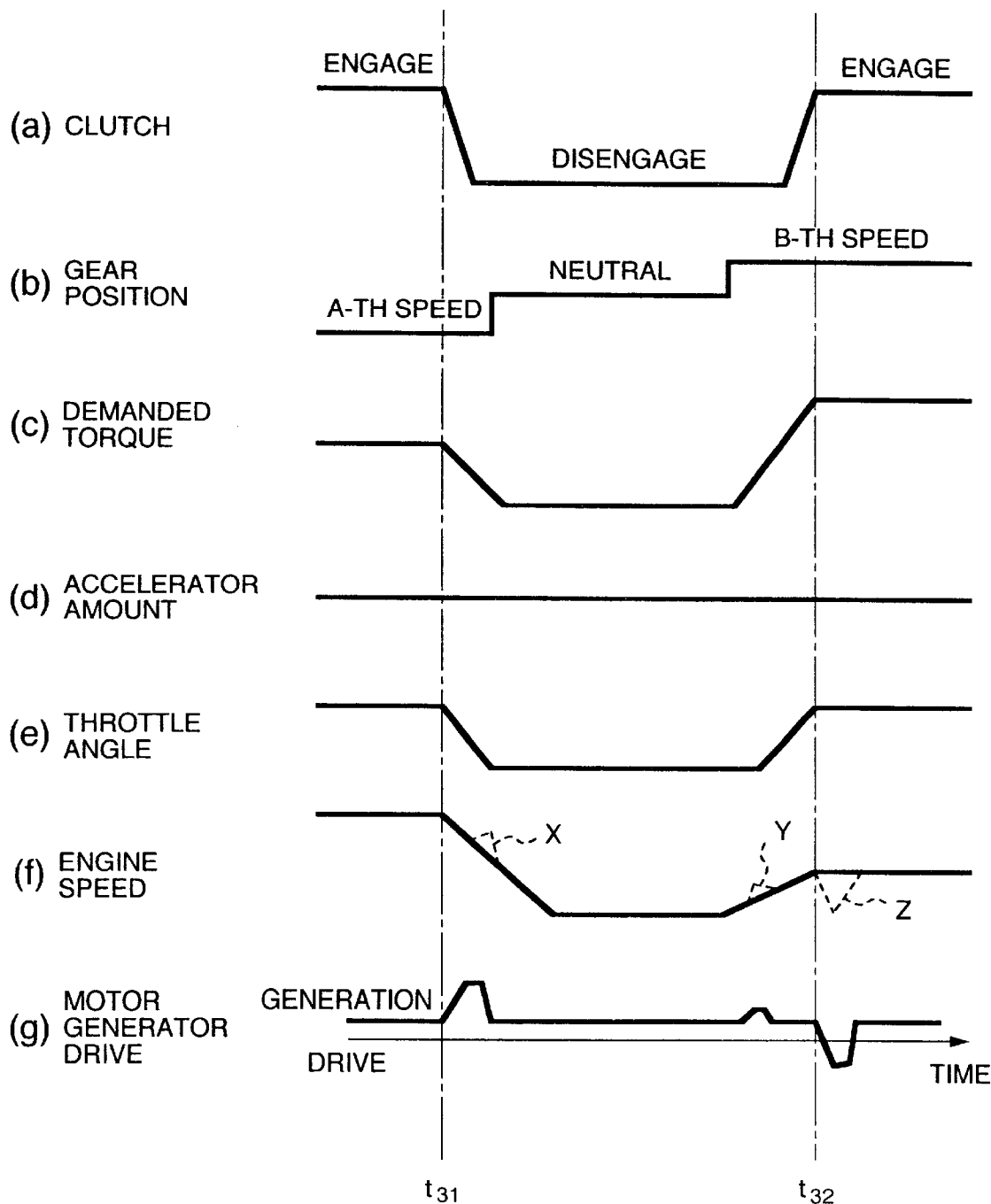

TRANSMISSION CONTROL SYSTEM

BACKGROUND OF THE INVENTION

The present invention relates generally to a transmission control system for controlling a transmission having a plurality of gear positions. More particularly, the invention relates to a transmission control system suitable for an automated manual transmission.

An automated manual transmission (M/T) employs a mechanical clutch in place of a fluid clutch employed in an ordinary automatic transmission (A/T) to automatically manipulate a clutch for engaging and disengaging by means of an actuator. Such automated manual transmission is apt to be employed in some kinds of European sporty cars. In the automated manual transmission, a shift lever has the first speed gear position, second speed gear position, . . . sixth speed gear position and so forth, similarly to the ordinary manual transmission. A clutch operation of the driver in the conventional M/T is automated in such a manner that when a driver operates the shift lever, a shift control system detects the shifting operation, releases the clutch by controlling an actuator, shifts the gear positions, and then engages the clutch. On the other hand, the automated manual transmission also has a "Drive" (D) range position. In a period of holding at D range, engaging and disengaging of the clutch and shifting of the gear positions are performed automatically depending upon depression amount of an accelerator pedal and a vehicle speed, like shifting operation of an ordinary A/T.

As disclosed in JP-A-7-197955, automatic disengaging and engaging of the clutch is controlled by effecting an engine control for preventing the engine from causing stalling due to damping effect for forced operation of the clutch in such a manner that torque and engine revolution speed control in response to the shifting demand is performed by varying an output torque of the engine through a spark ignition timing, a fuel injection amount and an air flow rate of an induction air of the engine.

However, as disclosed in the above-identified JP-A-7-197955, in a system to perform the engine control in response to shifting operation, the engine is driven at engine operation parameter values far different from optimal values at a combustion demand in common engine control. As a counter effect, various problems, such as degradation of fuel economy, lowering of torque response, degradation of emission control performance and so forth can be caused.

SUMMARY OF THE INVENTION

It is therefore an object of the present invention to provide a shift control system which can reduce degradation of engine characteristics upon shifting operation and can reduce a load on the side of a clutch and a transmission due to delay of response.

In order to accomplish the above-mentioned object, a shift control system, according to the present invention, comprises:

an engine generating a driving force;
a transmission having a plurality of gear positions for transmitting the driving force developed by the engine to driving wheels;
a clutch for connecting the engine and the transmission;
engine control means for controlling the engine;
transmission control means for switching gear positions of the transmission;
clutch control means for controlling disengagement and engagement of the clutch;
an electric motor connected to a drive shaft of the engine and capable of performing regenerating operation;
motor control means for controlling the electric motor for driving the electric motor for generating a driving force or for performing regenerating operation,
the motor control means transmitting the driving force to the driving wheels upon shifting operation by the transmission and performing regenerating portion by an energy from the driving wheels.

With the construction set forth above, by transmission of the driving force of the electric motor or regeneration operation by the electric motor upon shifting operation, degradation of the engine characteristics can be reduced. In conjunction therewith, load on the clutch and the transmission due to delay of response can be reduced.

In the construction set forth above, it is preferred that the shift control system further comprises general control means for making judgment of share of operation of torque generation by the engine and torque generation by the electric motor, one of the engine control means and the motor control means controls one of the engine and the electric motor according to a command from the general control means.

In the construction set forth above, it is preferred that the general control means controls the electric motor by the motor control means when a difference between a torque demanded by a next gear position and a current gear torque is within a torque control range of the electric motor, during shifting of gear position by shifting operation.

Also, in the construction set forth above, it is preferred that the motor control means derives a target revolution speed of the electric motor variable according to elapsed time after shifting and controls revolution speed of the electric motor on the basis of the target revolution speed.

According to another aspect of the present invention, a control system for controlling a transmission connected between an output of an engine and driving wheels, comprises:

regeneratable electric motor connected to an output shaft of the engine for transmitting and receiving driving force to and from the output shaft;
motor control means for selectively controlling operation for converting a driving energy from the driving wheels into an electric energy by the regeneratable electric motor; and
transmission control means for controlling operation of transmission of a driving force of the engine to the driving wheels and operation of transmission of a driving force of the regeneratable electric motor to the output shaft of the engine.

BRIEF DESCRIPTION OF THE DRAWINGS

FIG. 12 is an explanatory illustration showing the second example of the operation of the control share judgment unit in one embodiment of the present invention;

FIG. 13 is an explanatory illustration of a control operation of a torque control unit to be employed in one embodiment of the shift control system according to the present invention;

FIG. 14 is a block diagram showing a construction of an engine revolution speed control unit in one embodiment of the present invention; and FIG. 15 shows timing charts (a)–(g) of a control employing the engine revolution speed control unit in one embodiment of the present invention.

DESCRIPTION OF THE EMBODIMENT

One embodiment of a shift control system according to the present invention will be discussed hereinafter with reference to FIGS. 1 to 15.

Figure 1:
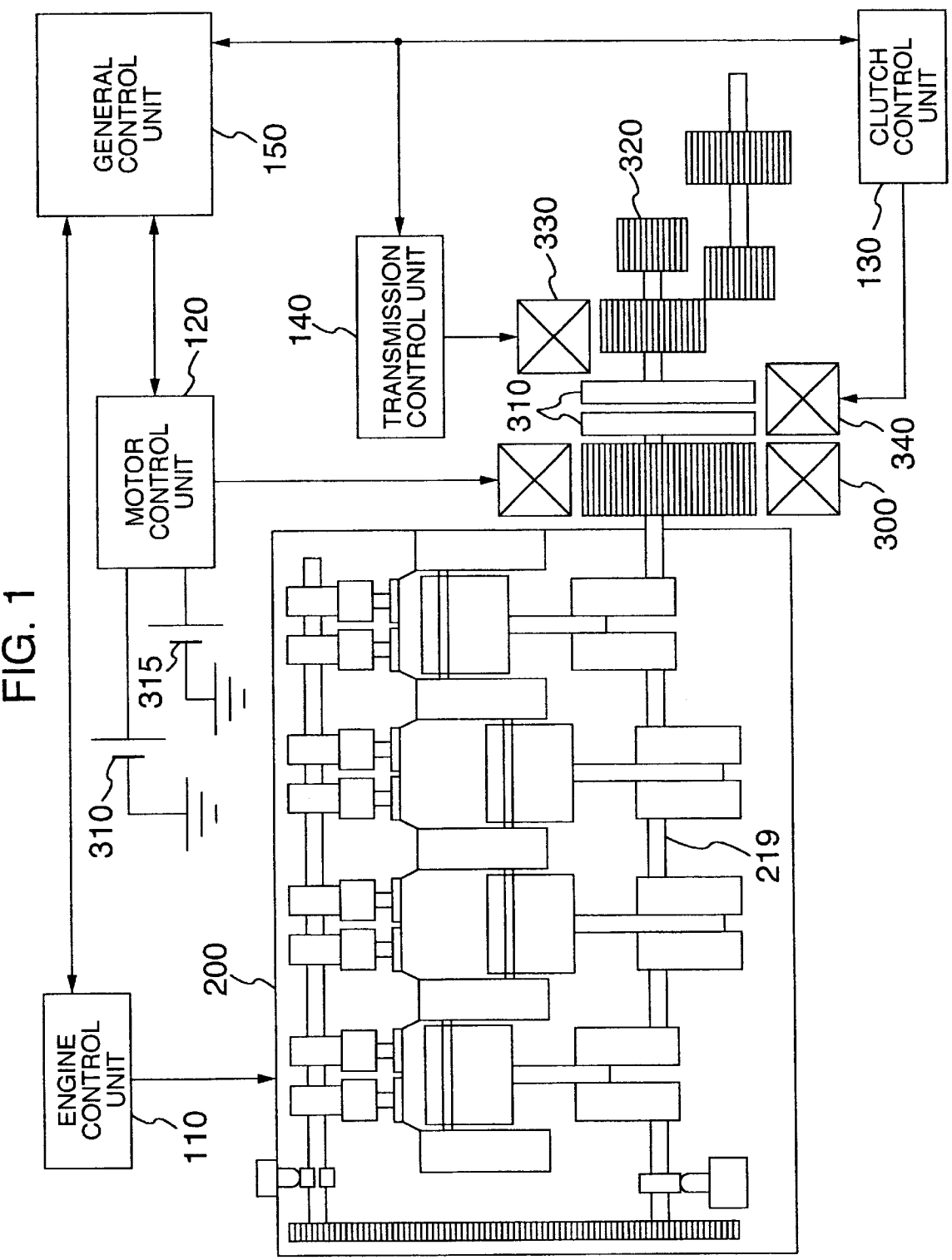
FIG. 1 is a block diagram showing an overall construction of a vehicle control system employing one embodiment of a shift control system according to the present invention.

At first, referring to FIG. 1, an overall construction of a vehicle control system employing the shown embodiment of the shift control system will be discussed with reference to FIG. 1.

An engine 200 is controlled by an engine control unit 110. The engine 200 generates a driving force by combustion depending upon operation of an accelerator pedal by a driver. On a driving force output shaft (crankshaft) 219 of the engine 200, an electric motor 300 is connected. The electric motor 300 is a motor having a regeneration function for collecting deceleration energy of a vehicle as an electric energy. On the other hand, during normal driving state, the electric motor 300 generates a driving torque to be applied to the driving force output shaft 219 to operate the engine 200 under condition achieving high efficiency of the engine. The electric motor 300 is possibly minimum size and potentially has an output torque in the extent of about 5 to 10% of the output torque of the engine. For example, when an output torque of the engine 200 is 300 PS in terms of horsepower, the electric motor 300 having about 15 PS of output may be employed. The electric motor 300 is controlled by a motor control unit 120. By regenerating operation of the electric motor 300, the braking energy is collected as the electric energy and accumulated in a first power source 310. A second power source 315 is mainly supplied to a driving power.

A driving force generated by the engine 200 and the electric motor 300 is transferred on the side of a transmission 320 across a clutch 310, and then transmitted on the side of driving wheels. Upon occurrence of shifting demand by a driver or a driving condition, a clutch actuator 340 of the clutch 310, which is constructed with a hydraulic mechanism, is controlled by a clutch operation control unit 130. Disengaging and engaging operation of the clutch 310 can be realized without the driver's operation for disengaging and engaging.

On the other hand, the transmission 320 is an automated M/T which can realize both of manual shifting through selective shifting operation by the driver and automatic shifting depending upon driving condition depending upon a vehicle speed and a load. The transmission 320 is controlled by a transmission control unit 140 and performs shifting from a current gear position to a next gear position by controlling a shifting actuator 330 which is constructed with a hydraulic mechanism or so forth.

Here, if the shifting demand is caused by the driver or the driving condition, the shifting demands is detected and recognized by a general control unit 150 to initiate actual shifting operation. The general control unit 150 outputs a disengaging demand of the clutch 310 to the clutch operation control unit 130 and an engaging demand of the clutch 310 after shifting the gear position. On the other hand, the general control unit 150 outputs a shifting demand for the next gear position to the transmission control unit 140. Furthermore, the general control unit 150 outputs a torque demand and an engine revolution speed demand up to engagement of the clutch 310 to the engine control unit 110 and the motor control unit 120. The general control unit 150 controls a sequence of shifting operation by controlling the clutch control unit 130, the transmission control unit 140, the engine control unit 110 and the motor control unit 120. Respective control unit receiving the demands drive own actuators for realizing smooth shifting.

Next, discussion will be given for construction of the engine to be employed in a vehicle control system employing the shown embodiment of a shift control system.

Figure 2:
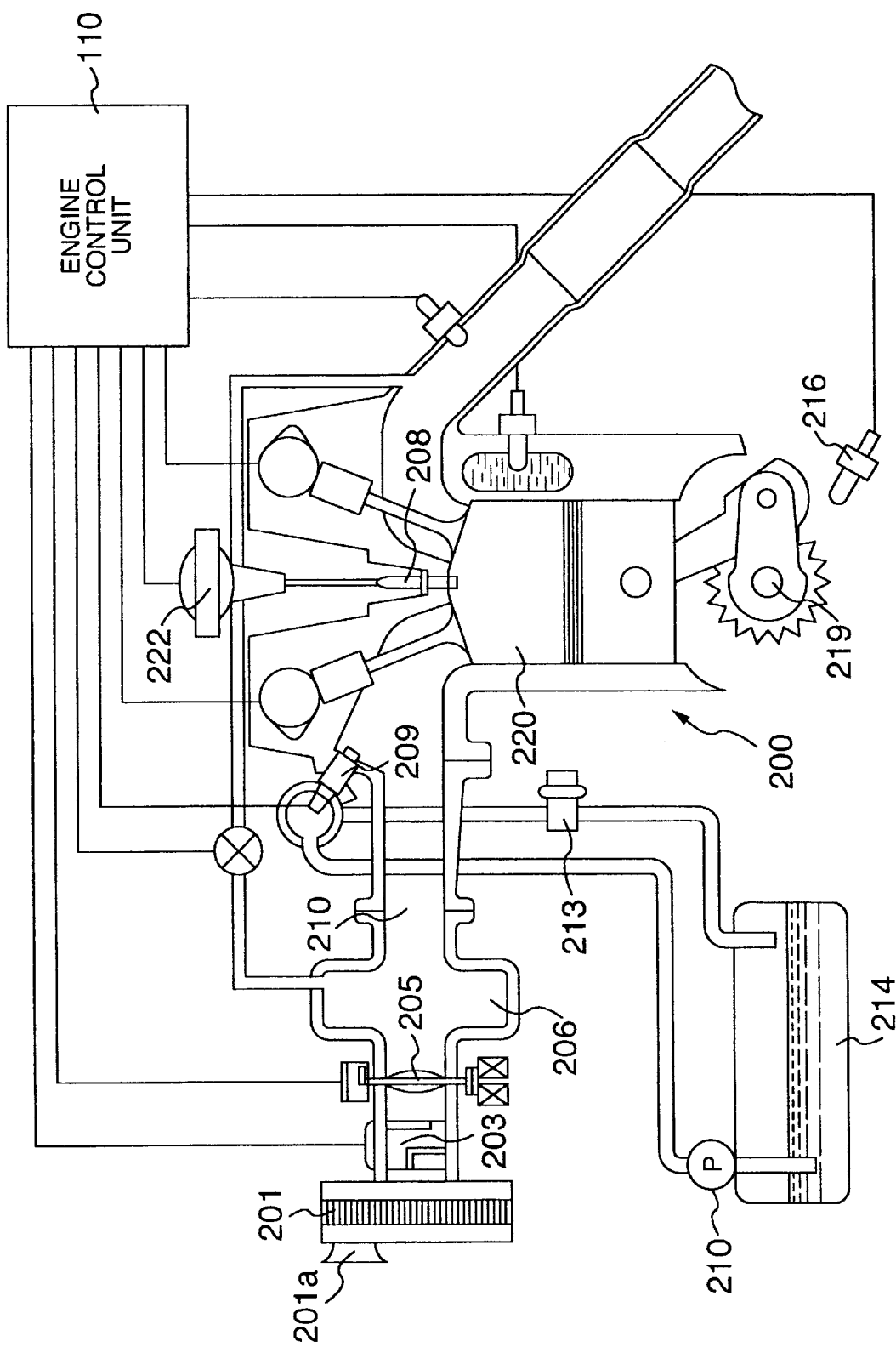
FIG. 2 is a block diagram showing a construction of an engine to be used in the vehicle control system employing one embodiment of the shift control system according to the present invention.

FIG. 2 is a block diagram showing the construction of the engine to be employed in the vehicle control system employing one embodiment according to the present invention.

Air to be introduced into the engine 200 is sucked through an inlet portion 201a of an air cleaner 201 and flows into a collector 206 through an air flow sensor 203 and a throttle body, in which a throttle valve 205 for controlling an intake air flow rate is housed. The air introduced into the collector 206 is distributed to respective induction pipes 210 connected to respective cylinders of the engine and then introduced into the cylinders 220. On the other hand, the throttle valve 205 can be opened and closed by means of a motor.

On the other hand, fuel, such as gasoline or so forth, is sucked into a low pressure fuel pump 210 from a fuel tank 214, pressurized by the low pressure fuel pump 210 and then fed to injectors 209. The fuel is regulated to a predetermined pressure by a pressure regulator 213. Spark ignition of the fuel injected from the injector 209 is performed by spark ignition plugs 208 in response to a spark signal of high voltage generated by an ignition coil 222.

On the other hand, the air flow sensor 203 outputs a signal indicative of the air flow rate for inputting to the engine control unit 110. Furthermore, on the throttle body, a throttle angle sensor for detecting an angular position of the throttle valve 205 is mounted. An output of the throttle angle sensor is also input to the engine control unit 110. A crank angle sensor 216 detects the rotation of the crankshaft and generates a revolution speed signal. The revolution signal is inputted to the engine control unit 110. The engine control unit 110 controls an injection amount of the fuel, a fuel injection timing, a spark ignition timing, a throttle valve angular position and so forth on the basis of these input signals.

Next, a construction of the shown embodiment of the shift control system will be discussed with reference to FIG. 3. It should be noted that like reference numerals to those in FIG. 1 identify the same components.

Figure 3:
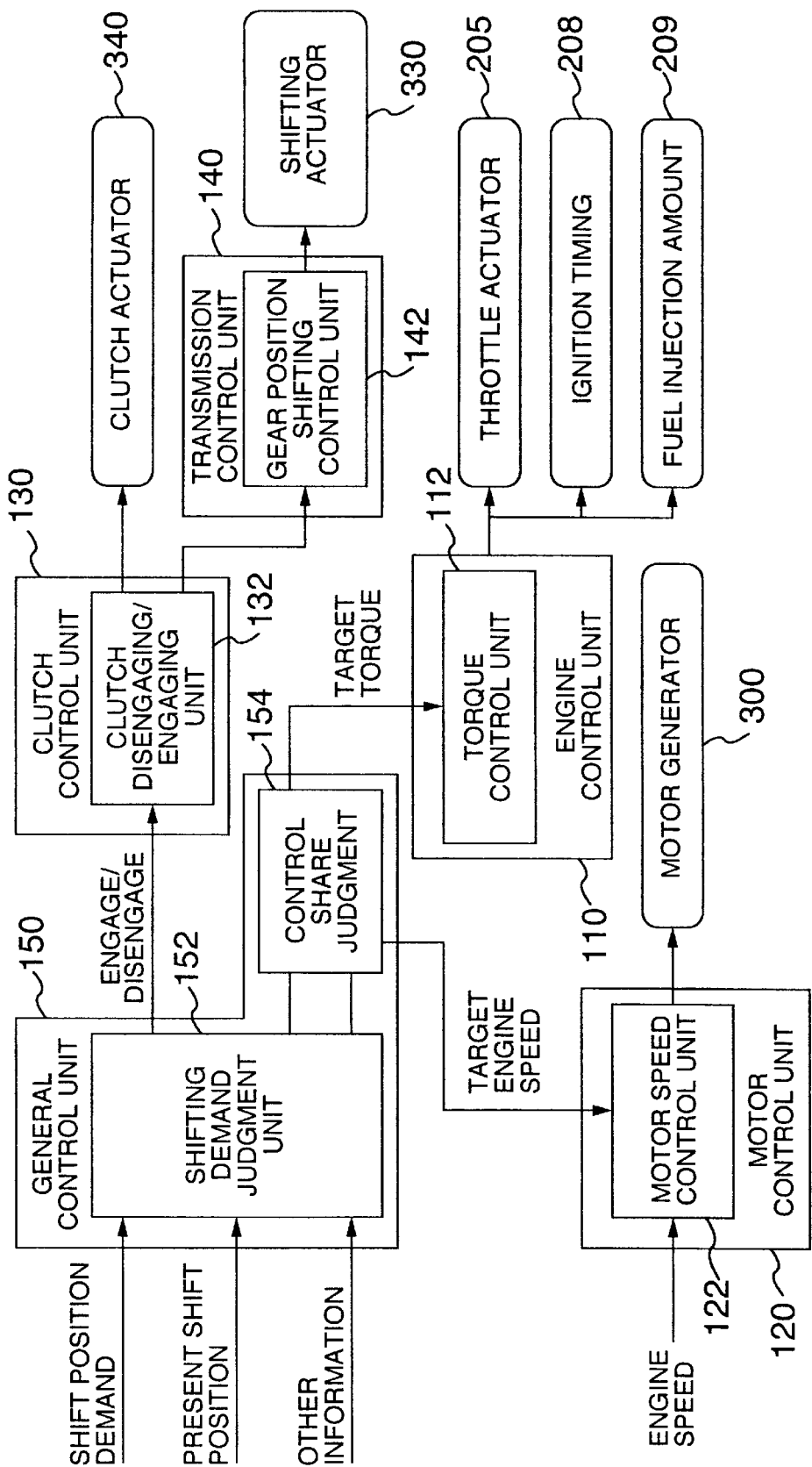
FIG. 3 is a block diagram showing a construction of one embodiment of the shift control system according to the present invention.

FIG. 3 is a block diagram showing a construction of one embodiment of the shift control system according to the present invention.

To shifting demand judgment unit 152 of the general control unit 150, a shift demand (shift position demand) depending upon operation of the driver or a driving condition based on the vehicle speed and the load, a current gear position (shift position) and other necessary parameters, such as an engine revolution speed, the vehicle speed, an engine coolant temperature, a clutch engaging and disengaging state, a gear position and so forth, are input. The shifting demand judgment portion 152 makes judgment whether shifting can be initiated or not depending upon a current driving range and the demand. If shifting is permitted, clutch engaging and disengaging control unit 132 of the clutch control unit 130 outputs a clutch disengaging demand.

The clutch engaging and disengaging control unit 132 operates the clutch actuator 340 constructed with a hydraulic, pneumatic and electric mechanism or so forth in response to the clutch disengaging demand, to disconnect a power train from a clutch input shaft on the side of the driving source constituted of the engine and the electric motor, to a clutch output shaft on the side of the transmission. At this time, the clutch engaging and disengaging control unit 132 corrects the detected values of fluid temperature, pressure and electric characteristics particular to the mechanism. The clutch engaging and disengaging control unit 132 monitors the state of the clutch. Upon completion of the clutch disengaging operation actually, gear position shifting control unit 142 of the transmission control unit 140 outputs a shifting demand of the gear position.

The gear position shifting control unit 142 controls the shifting actuator 330 on the basis of the gear position shifting demand to disengage (release) the currently engaged gears to disconnect between the driving wheels and the inside of the transmission to place the transmission in the neutral position, at first. Subsequently, by means of synchronous meshing mechanism, such as synchromesh or so forth, shifting and establishing of the next gear position is performed. When the shifting actuator 330 is constructed with the hydraulic, electric or pneumatic type actuator, gear position shifting unit 142h performs correction of characteristics thereof.

Control share judgment unit 154 outputs a demanded value of the torque of the engine and a demanded value of revolution speed control for the electric motor, in conjunction with shifting operation to the next gear position. The control share judgment unit 154 makes judgment whether a required torque upon shifting can be satisfied by only output performance of the electric motor or by a combination of the outputs of engine and the electric motor, in consideration of the driving condition and shifting response demand period adapted to a driver's intention predicted by the driving condition to determine respective shares. If judgment is made that a torque control by the engine is required, in the control share judgment unit 154, a torque value or torque operation amount to be generated by the power sources required for the next gear position is predicted for outputting to the engine control unit 110 and the torque control unit 112 as a target torque value.

The torque control unit 112 operates respective of a throttle valve 205 (throttle actuator) controlling an intake air flow rate, spark ignition timing of the ignition plug 208, the fuel injection amount of the injector 209 controllable on the side of the engine for satisfying the demanded torque value and the response period, solely or in combination. A current torque value generated by the engine may be replaced with a value derived from an overall performance characteristics of the engine on the basis of a measured intake air flow rate and a driving load, such as a fuel injection amount or so forth.

On the other hand, the control share judgment unit 154 predicts rotation speed of a clutch part on the side of the driving wheels, when the transmission ratio is changed the shifting actuator 340 and the part of clutch on the side of the wheels is driven from the driving wheels, on the basis of the vehicle speed or so forth, and thus determines a target rotation speed of another clutch part on the side of the power source so as to avoid shock upon clutch engagement and occurrence of overloading. A motor revolution speed control unit 122 of the motor control unit 120 receiving the target revolution speed operates the motor actuator 312 for matching the current rotation speed of the clutch part on the side of the power source for performing feedback control or so forth.

Shift demand judgment unit 152 makes judgment that adjustment of the driving force by the torque control unit 112 or the revolution speed control unit 122 is completed. If shifting of the gear position by the gear position shifting control unit 142 is completed, the clutch engaging demand is again output to the clutch disengaging and engaging control unit 132 to establish connection between the power source side and the driving wheel side by the clutch actuator 340 to complete a sequence of shifting operation.

Next, content of the demand judgment process in the shifting demand judgment unit 152 to be employed in the shown embodiment of the shift control system will be discussed with reference to FIGS. 4 to 7.

Figure 4:
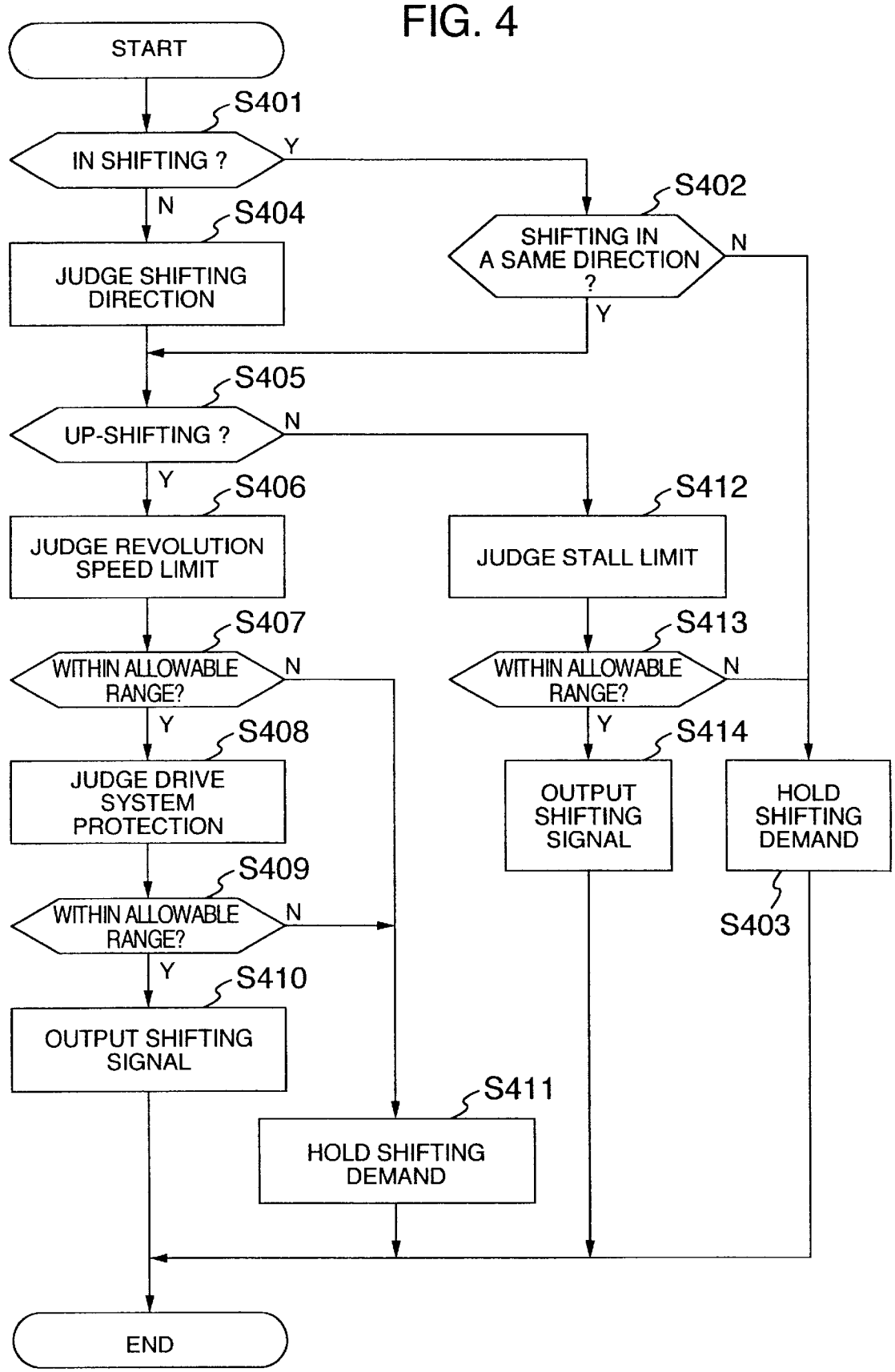
FIG. 4 is a flowchart showing a content of a demand judgment process of a shift demand judgment unit 152 in one embodiment of the present invention.

FIG. 4 is a flowchart showing the content of the demand judgment process of the shown embodiment of the shifting demand judgment unit 152.

The following discussion will be given for the case where the driver causes gear position shifting demand by manual operation. This process may be regularly calculated per a regular timing or angular interval. However, in the shown embodiment, the process is performed only upon occurrence of shifting demand of the gear position by manual operation of the driver.

At step s401 of FIG. 4, the shifting demand judgment unit 152 makes judgment whether shifting is currently demanded or not on the basis of output condition of clutch disengaging demand or so forth to the clutch disengaging and engaging control unit 132. If in non shifting state, the process is advanced to step s404, on the other hand, if in shifting state, the process is advanced to step s402.

While the shifting demand is present (during shifting in response to preceding gear position shifting demand), at step s402, the shifting demand judgment unit 152 makes judgment whether the demanded shift is the same direction (upshift or downshift) or not. If the same direction, the process is advanced to step s405, and otherwise, the process is advanced to step s403.

At step s403, the shifting demand judgment unit 152 performs on-going shifting operation with abandoning (holding) the gear position shifting demand from the driver. In practice, upon occurrence of shifting demand for shifting from the first speed gear position to the third speed gear position during shifting operation from the first speed gear position to the second speed gear position, the target gear position to shift is replaced with the third speed gear position. On the other hand, when down-shifting from the second speed gear position to the first speed gear position is demanded (actually, the first speed gear position or neutral position) during shifting operation from the first speed gear position to the second speed gear position, the demand is abandoned and on-going shifting operation from the first speed gear position to the second speed gear position is performed.

On the other hand, in the judgment at step s401, if judgment is made that current state is not shifting state, the shifting demand judgment unit 152 makes judgment whether the gear position shifting demand is upshift or not, namely upshift or downshift, at step s404. If the gear position shifting demand is for shifting down, the process is advanced to step s406, and if the gear position shifting demand is for shifting up, the process is advanced to step s412.

In case of downshifting, at step s406, the shifting demand judgment unit 152 derives a revolution speed at the next gear position on the basis of the vehicle speed. Then, the revolution speed thus derived is compared with a predetermined revolution speed to make judgment of revolution speed limit. Then, at step s407, judgment is made whether the revolution speed is in shiftable region or not.

One example of revolution speed limit will be discussed with reference to FIG. 5.

Figure 5:
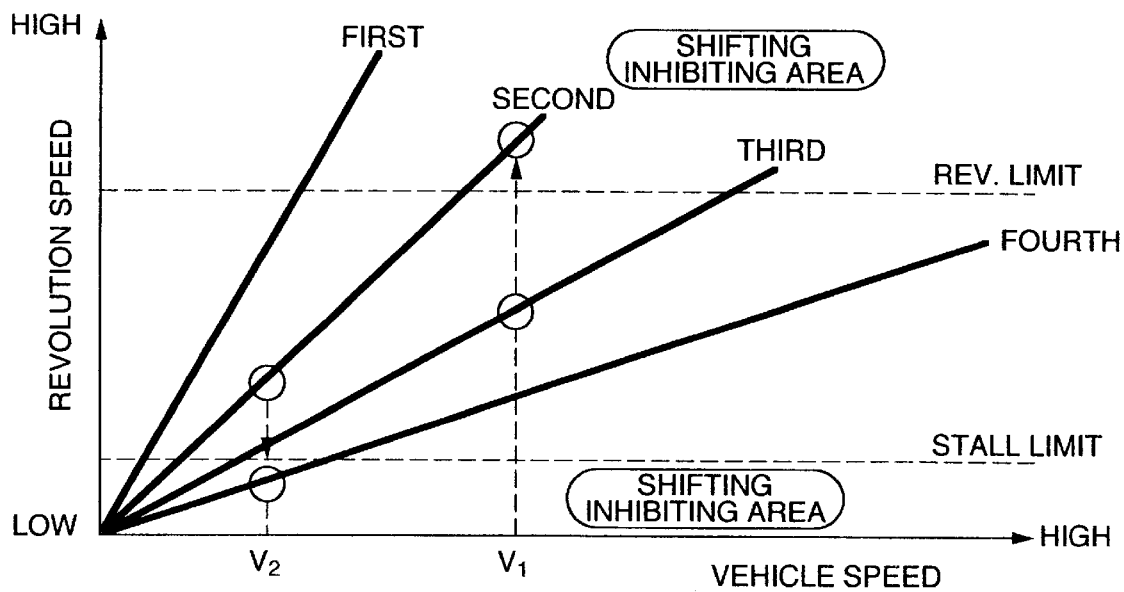
FIG. 5 is an explanatory illustration of a revolution upper limit judgment in the shift demand judgment unit 152 in one embodiment of the present invention.

In FIG. 5, a horizontal axis represents the vehicle speed and a vertical axis represents the engine revolution speed. Then, relationship between the vehicle speed and the engine revolution speed is established as control constant in a form of map and table per each gear position. Upon occurrence of the gear position shifting demand, the revolution speed at the next gear position to be a target is calculated. If the revolution speed is lower than or equal to the predetermined revolution speed (revolution speed limit), shifting is permitted. Conversely, if the revolution speed is higher than the revolution speed limit, shifting is inhibited in view of engine protection and drivability.

For example, when the current gear position is the third speed gear position at the vehicle speed V1 and the next gear position is the second speed gear position, the engine revolution speed can exceed the revolution speed limit. Thus, shifting of the gear position is inhibited. Here, the revolution speed limit is variable depending upon characteristics of the engine or so forth, and set at 6,500 r.p.m., for example.

Next, at step 408 of FIG. 4, the shifting demand judgment unit 152 compares the torque of the next gear position and the torque at the current gear position for protecting the drive system. At step 409, judgment is made whether the deviation of the torques is in the allowable range or not.

Here, one example of the torque judgment for protecting the drive system will be discussed with reference to FIG. 6.

Figure 6:
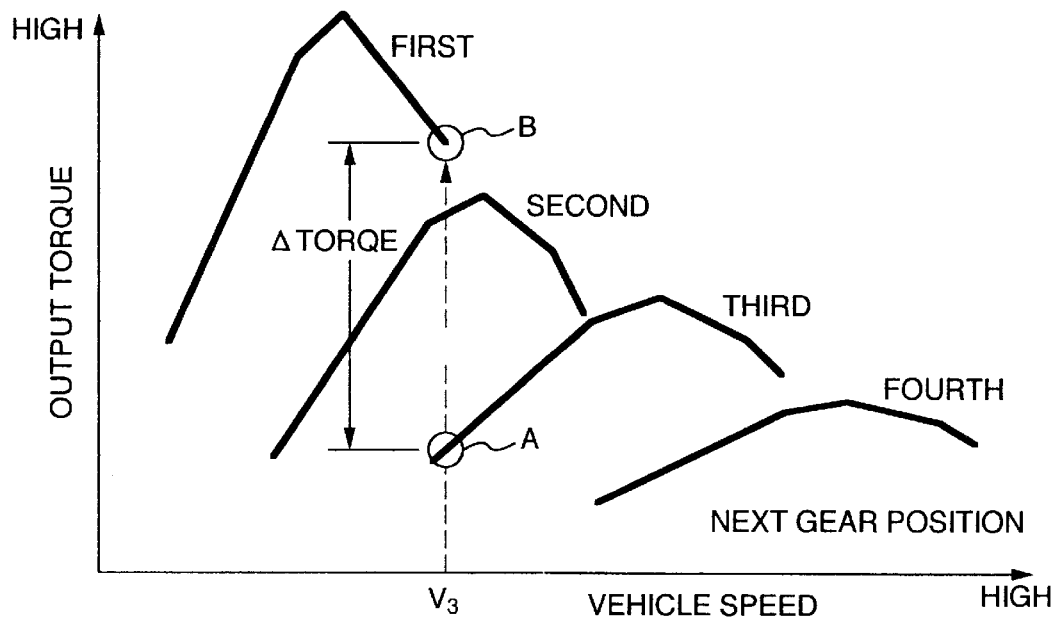
FIG. 6 is an explanatory illustration of a drive protective torque judgment in the shift demand judgment unit 152 in one embodiment of the present invention.

FIG. 6 is an explanatory illustration for torque judgment for protecting the drive system in one embodiment of the shifting demand judgment unit 152 according to the present invention.

In FIG. 6, the horizontal axis represents the vehicle speed and the vertical axis represents the output torque of the engine. Then, relationship between the vehicle speed and the engine revolution speed is established as control constant in a form of map and table per each gear position. Upon occurrence of the gear position shifting demand, an allowable value is set for a variation amount ΔTORQE between the torque A in the current gear position and the torque B to be generated at the next gear position, to make judgment whether shifting is to be permitted or inhibited for the purpose of drivability of the vehicle and protection of the drive system.

For example, when shifting demand to the first speed gear position occurs at the current third speed gear position at the vehicle speed V3, the torque difference ΔTORQE is caused between A and B in FIG. 6. By setting the allowable value for the torque difference ΔTORQE, if the torque difference is greater than or equal to the allowable value, shifting is inhibited.

Returning to FIG. 4, in judgment at steps s406 and s408, if the torque difference is within the allowable range, at step s410, the shift demand judgment unit 152 permits shifting of the gear position shifting demand and outputs the cluck disengaging demand to the clutch disengaging and engaging control unit 132. Otherwise, at step s411, the shifting demand judgment unit 152 abandons (holds) the gear position shifting demand.

On the other hand, in judgment at step s405, demanded shift is upshift, the shifting demand judgment unit 152 performs judgment of revolution speed limit on low speed side for fear of engine stalling.

As shown in FIG. 5, the relationship between the vehicle speed and the engine revolution speed is established as control constant in a form of map and table per each gear position. Upon occurrence of the gear position shifting demand, the revolution speed at the next gear position to be the target is calculated. If the calculated revolution speed is lower than the predetermined revolution speed (stalling limit), stalling can be caused on the side of the engine by the input from the driving wheels side upon shifting to cause engine stalling. Therefore, shifting of the gear position is inhibited.

For example, upon upshifting to four speed from the current second speed gear position at the vehicle speed V2, the revolution speed can be dropped to be lower than or equal to the stalling limit. Therefore, shifting of the gear position is inhibited. The engine revolution speed at the stalling limit may be variable depending upon the characteristics of the engine. The stalling limit may be set at 500 r.p.m., for example.

Next, at step s413 of FIG. 4, the shifting demand judgment unit 152 makes judgment whether the engine revolution speed after upshifting is above the stalling limit or not. If the engine revolution speed is higher than or equal to the stalling limit, the clutch disengaging demand is output at step s414. Otherwise, the gear position shifting demand is abandoned (held) at step s415.

Next, operation of the shifting demand judgment unit 152 upon automatic shifting of the shown embodiment depending upon the driving condition will be discussed with reference to FIG. 7.

Figure 7:
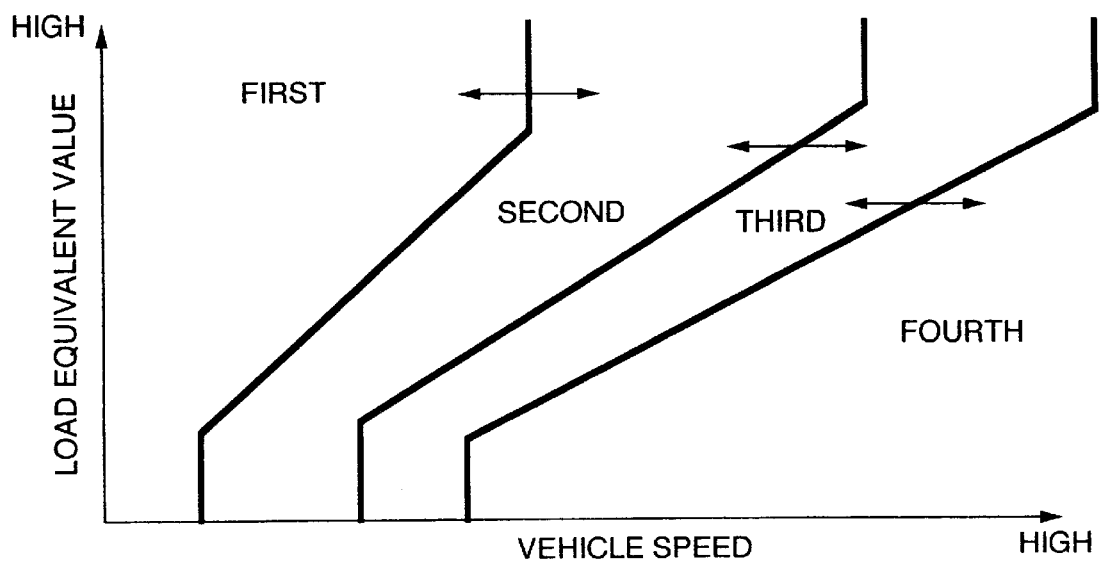
FIG. 7 is an explanatory illustration of an operation of the shift demand judgment unit in automatic shifting depending upon a driving condition in one embodiment of the present invention.

FIG. 7 is an explanatory illustration of operation of the shifting demand judgment of the automatic shifting in one embodiment of the present invention depending upon the driving condition.

In FIG. 7, a horizontal axis represents the vehicle speed and a vertical axis represents load equivalent value corresponding to an accelerator pedal depression magnitude.

Depending upon the vehicle speed and the load equivalent value corresponding to the accelerator pedal depression magnitude, automatic shifting patterns are set for each gear position. The shifting demand judgment unit 152 makes judgment of occurrence of the gear position shifting demand from the vehicle speed and the load equivalent value using the automatic shifting patterns for outputting the clutch disengaging demand to the clutch disengaging and engaging control unit 132.

Next, one example of operation of the control share judgment unit 154 in the shown embodiment will be discussed with reference to FIGS. 8 to 10.

Figure 8:
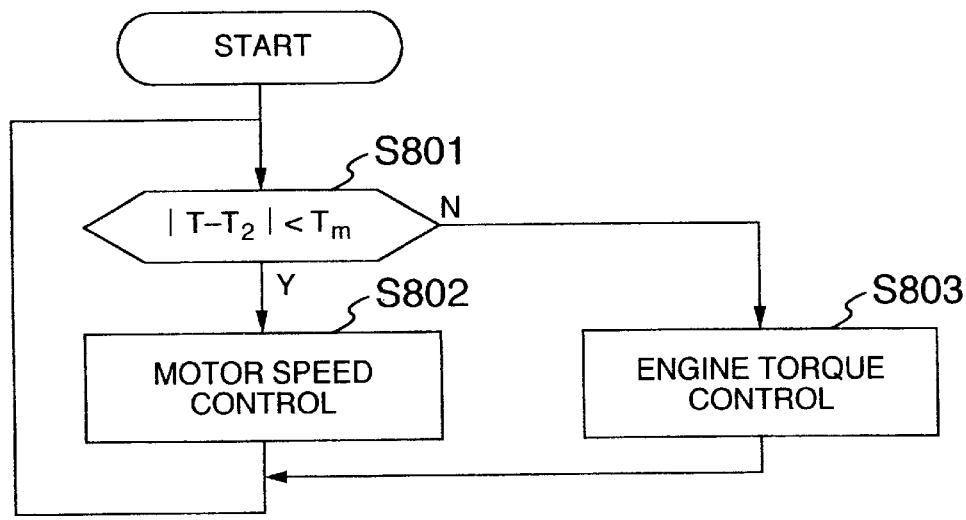
FIG. 8 is a flowchart showing a first example of an operation of a control share judgment unit in one embodiment of the present invention.
Figure 9:
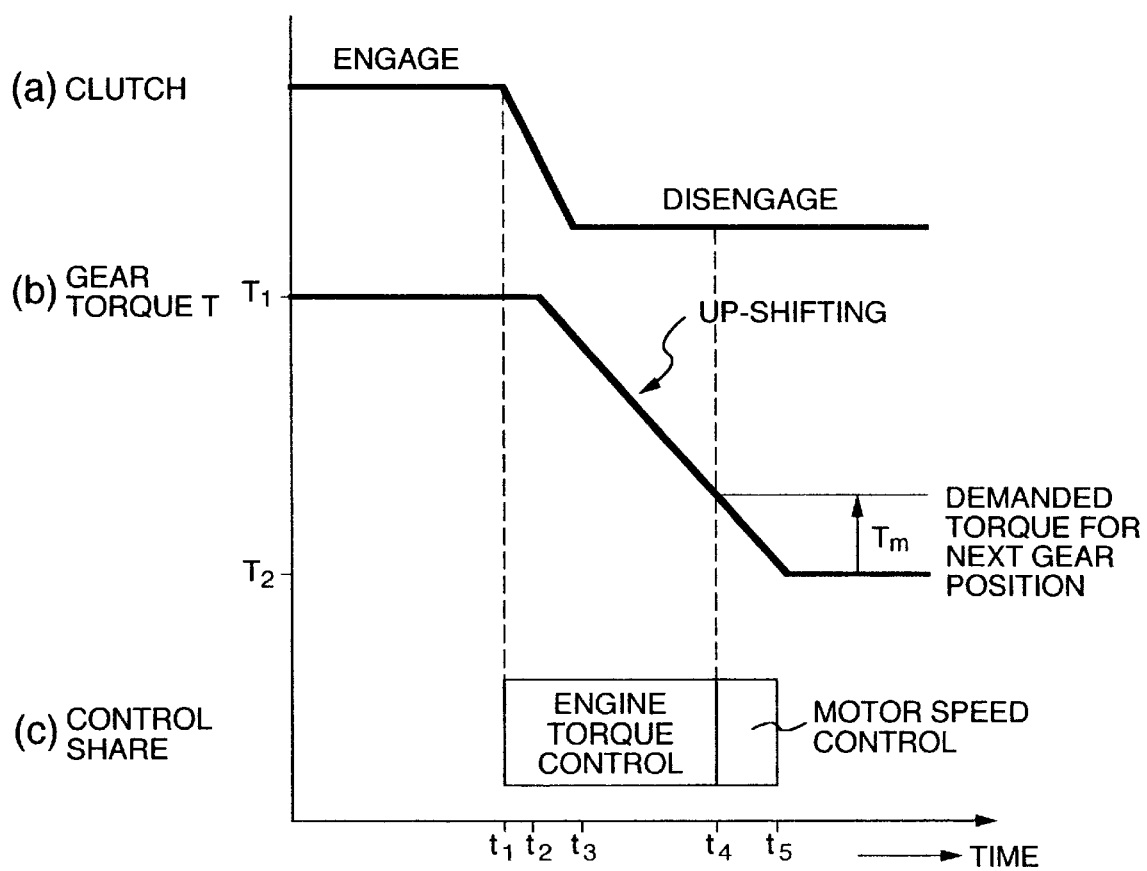
FIG. 9 is an explanatory illustration of one example of the operation of the control share judgment unit in one embodiment of the present invention.
Figure 10:
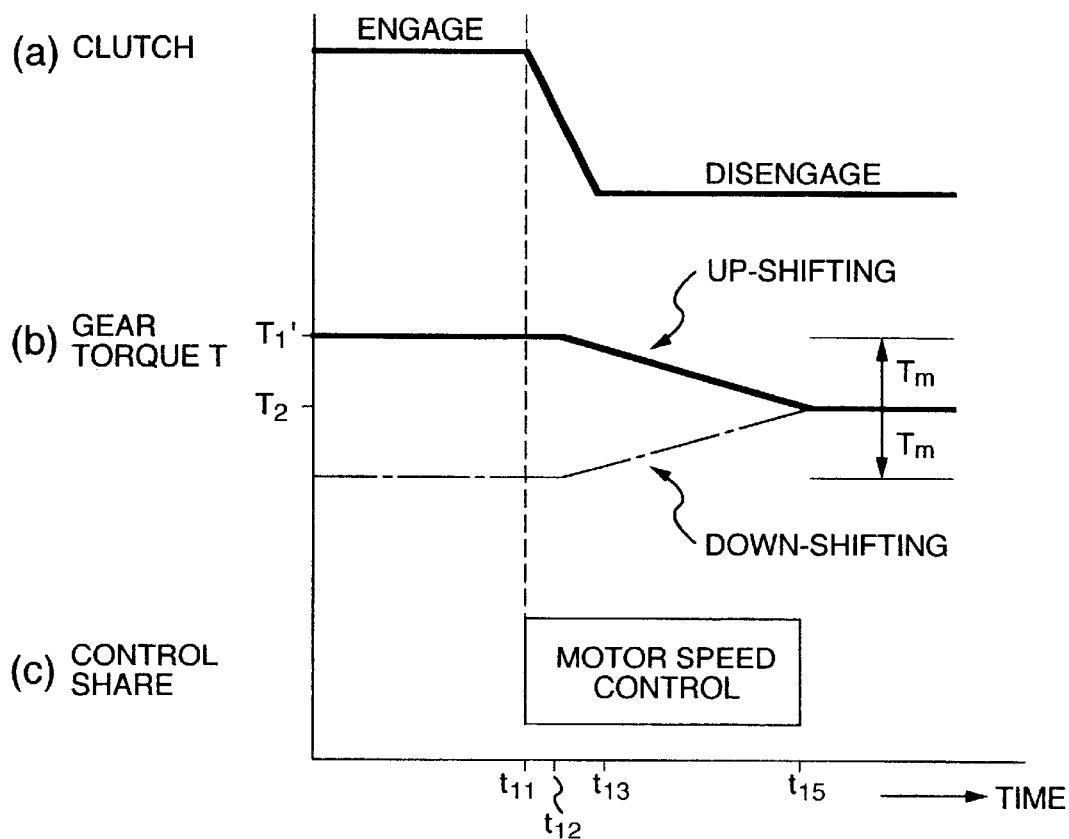
FIG. 10 is an explanatory illustration of the first example of the operation of the control share judgment unit in one embodiment of the present invention.

FIG. 8 is a flowchart showing one example of operation of the control share judgment unit in one embodiment of the present invention, and FIGS. 9 and 10 are explanatory illustrations showing operation of the control share judgment unit in one embodiment of the present invention.

At step s801 of FIG. 8, the control share judgment unit 154 makes judgment whether an absolute value of (current engine torque T—demanded torque for next gear position T2) is smaller than a motor torque Tm or not. If smaller, at step s802, the control share judgment unit 154 executes the motor revolution speed control, and otherwise, at step s803, the control share judgment unit performs the engine torque control.

Here, particular discussion will be given for flow of process of FIG. 8 with reference to FIG. 9.

A horizontal axis of FIG. 9 represents a time t, (a) of FIG. 9 represents engaging and disengaging states of the clutch, and (b) represents a gear torque.

Namely, it is assumed that the shifting demand is caused to disengage the clutch at a time t1 of (a) in FIG. 9 and the clutch is completely disengaged at a time t3. (b) of FIG. 9 shows a gear torque T1 at engaging state of the clutch as shown in (a) of FIG. 9 and the demanded torque T2 at the next gear position. Here, since discussion will be given for upshifting, the gear torque T2 is smaller value than the gear torque T1. Furthermore, (c) of FIG. 9 shows share of control, namely whether engine torque control or motor revolution speed control is to be performed.

Initially, as shown by (b) of FIG. 9, when disengagement of the clutch is started at a time t1, the gear torque starts to be decreased from a time t2 with a little time lag from starting of clutch disengagement at the time t1. At this time, a difference between the current engine torque T and the demanded torque T2 at the next gear position is greater than the motor torque Tm. Accordingly, since the result of judgment at step s801 of FIG. 8 is NO, the engine torque control is performed at step s803. During a period from the time t1 to a time t4, the throttle actuator or so forth is controlled by the torque control unit in the engine control unit 110 shown in FIG. 3 for controlling the output torque of the engine. Namely, torque control is performed on the side of the engine control.

As a result, at the time t4, the gear torque T is lowered to a value of a sum of the demanded torque T2 for the next gear position and the motor torque Tm. Then, the result of judgment at step s801 of FIG. 8 becomes YES. Then, at step s802, the motor revolution speed is controlled by the motor revolution speed control unit 122 of the motor control unit 120. At this time, since the motor is controlled for reducing the gear torque, the motor performs regenerating operation. Then, when the current gear torque T becomes equal to the demanded torque T2 for the next gear position at a time t5, torque control is terminated. Namely, during a period from the time t4 to the time t5, torque control is performed on the side of the motor control.

As set forth above, in the shown embodiment, adjustment of the gear torque to control the current gear torque T to the demanded torque T2 for the next gear position, can be performed by motor revolution speed control, the adjustment is performed by motor revolution speed control. During the period from the time t1 to the time t4, gear torque control is performed by the engine torque control as in the prior art. Therefore, the engine control can be performed as in the common engine control to achieve improvement of fuel economy and torque response, and to reduce degradation of emission components of the exhaust gas.

It should be noted that regenerating operation of the motor is performed in the foregoing operation. However, in case of downshifting, for example, the electric motor is operated for driving to control the torque of the motor.

Next, the second particular embodiment of the flow of the process of FIG. 8 will be discussed with reference to FIG. 10.

Similarly to FIG. 9, in FIG. 10, a horizontal axis represents a time t, (a) of FIG. 10 shows engaged condition and disengaged condition of the clutch. On the other hand, (b) of FIG. 10 represents the gear torque.

The shown example represents the case where a difference between a torque T1' before shifting and a demanded torque for the next gear position is small such as shifting at low load range. In this condition, torque control can be performed only by the motor torque component Tm. Torque control is not demanded for the engine. Accordingly, in such condition, the engine can be adapted to the next gear position without varying the driving condition. However, since response to control by the electric motor is high, engine stalling or so forth may be caused in the low engine revolution speed range. Conditions are varied adapting to the engine driving conditions for avoiding engine stalling.

It is assumed that shifting demand occurs, disengagement of the clutch is taken place from a time t11 in (a) of FIG. 10, and the clutch is placed in completely disengaged position at a time t13. A solid line in (b) of FIG. 10 shows the gear torque T1' in the clutched engaged position and the demanded torque T2 for the next gear position in the case of upshifting. On dotted line in (b) of FIG. 10 shows the case of downshifting. (c) of FIG. 10 shows share of control, namely whether the engine torque control or motor revolution speed control is to b e performed.

Initially, as shown by (b) of FIG. 10, when disengagement of the clutch is started at a time t11, the gear torque starts to be decreased from a time t12 with a little time lag from starting of clutch disengagement at the time t11. At this time, it is assumed that a difference between the current engine torque T and the demanded torque T2 at the next gear position is smaller than the motor torque Tm. Accordingly, since the result of judgment at step s801 of FIG. 8 is YES, the motor revolution speed is controlled by the motor revolution speed control unit 122 of the motor control unit 120 at step s802. At this time, since the motor is controlled for reducing the gear torque, the motor performs regenerating operation. Then, when the current gear torque T becomes equal to the demanded torque T2 for the next gear position at a time t5, torque control is terminated. Namely, during a period from the time t14 to the time t15, torque control is performed on the side of the motor control.

Namely, when the difference between the current gear torque and the demanded torque for the next gear position is small, the gear torque is controlled only by the motor revolution speed control. Therefore, the engine control can be performed as in the regular engine control to achieve improvement of fuel economy and torque response, and to reduce degradation of emission component of the exhaust gas.

Next, the second example of operation of the control share judgment unit 154 in the shown embodiment will be discussed with reference to FIGS. 11 and 12.

Figure 11:
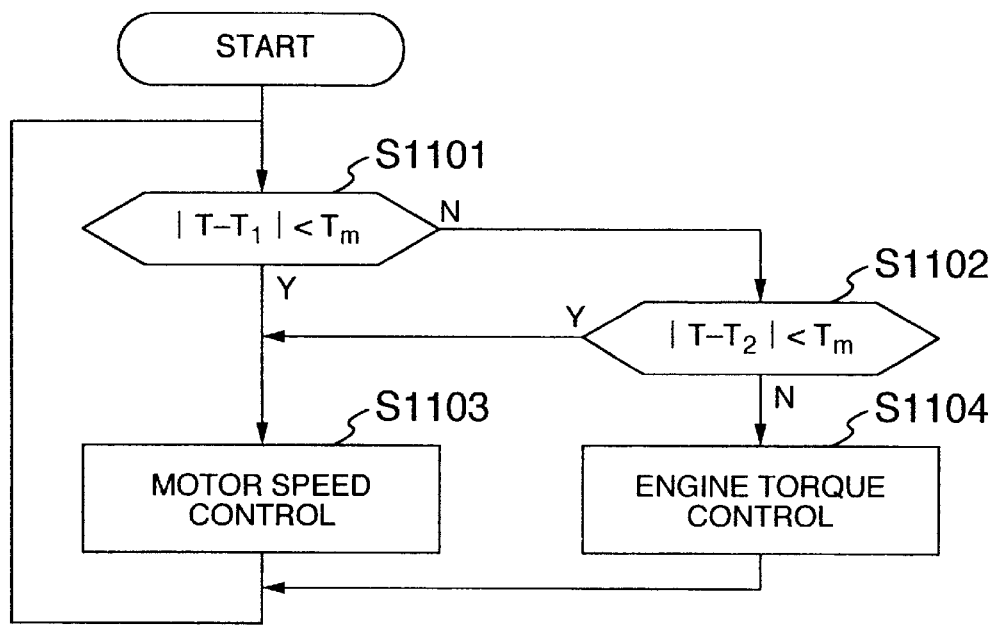
FIG. 11 is a flowchart showing the second example of the operation of the control share judgment unit in one embodiment of the present invention.

FIG. 11 is a flowchart showing the second example of operation of the control share judgment unit in one embodiment of the present invention, and FIG. 12 is an explanatory illustration of the second example of operation of the control share judgment unit in one embodiment of the present invention.

At step s1101 of FIG. 11, the control share judgment unit 154 makes judgment whether an absolute value of (current engine torque T—demanded torque for the preceding gear position T1') is smaller than a motor torque Tm or not. If smaller, at step s1103, the control share judgment unit 154 executes the motor revolution speed control, and otherwise, at step s1102, the control share judgment unit 154 makes judgment whether an absolute value of (current engine torque T—demanded torque for next gear position T2) is smaller than a motor torque Tm or not. If smaller, at step s1103, the control share judgment unit 154 executes the motor revolution speed control, and otherwise, at step s1104, the control share judgment unit performs the engine torque control.

Here, particular discussion will be given for flow of process of FIG. 11 with reference to FIG. 12.

Similarly to FIG. 9, a horizontal axis of FIG. 12 represents a time t, (a) of FIG. 12 represents engaging and disengaging states of the clutch, and (b) of FIG. 12 represents a gear torque.

It is assumed that the shifting demand is caused to disengage the clutch at a time t21 of (a) in FIG. 12 and the clutch is completely disengaged at a time t23. (b) of FIG. 12 shows a gear torque T1 at engaging state of the clutch as shown in (a) of FIG. 12 and the demanded torque T2 for the next gear position. Furthermore, (c) of FIG. 12 shows share of control, namely whether engine torque control or motor revolution speed control is to be performed.

Initially, as shown by (b) of FIG. 12, when disengagement of the clutch is started at a time t21, the gear torque starts to be decreased from a time t22 with a little time lag from starting of clutch disengagement at the time t21. At this time, a difference between the current engine torque T and the demanded torque T1 at the preceding gear position is smaller than the motor torque Tm. Accordingly, since the result of judgment at step s1101 of FIG. 11 is YES, the motor revolution speed control is performed at step s1103.

Next, at a time t23, the difference between the current engine torque T and the demanded torque T1 at the preceding gear position becomes greater than the motor torque Tm. Thus, the result of judgment at step s1101 of FIG. 11 becomes NO, and the difference of the current engine torque T and the demanded torque T2 for the next gear position is greater than the motor torque Tm, the result of judgment at step s1102 of FIG. 11 becomes NO. By the torque control unit 112 of the engine control unit 110, the throttle actuator or so forth is controlled to control the output torque of the engine.

Also, at the time t24, the gear torque T is lowered to a value of a sum of the demanded torque T2 for the next gear position and the motor torque Tm. Then, the result of judgment at step s1102 of FIG. 11 becomes YES. Then, at step s1103, the motor revolution speed is controlled by the motor revolution speed control unit 122 of the motor control unit 120. At this time, since the motor is controlled for reducing the gear torque, the motor performs regenerating operation to output rotation torque. Then, when the current gear torque T becomes equal to the demanded torque T2 for the next gear position at a time t25, torque control is terminated. Namely, during a period from the time t24 to the time t25, torque control is performed on the side of the motor control.

As set forth above, in the shown embodiment, adjustment of the gear torque to control the current gear torque T to the demanded torque T2 for the next gear position, can be performed by motor revolution speed control, the adjustment is performed by motor revolution speed control. During the period from the time t23 to the time t24, gear torque control is performed by the engine torque control as in the prior art. During the periods from the time t21 to the time t23 and from the time t24 to the time t25, the gear torque is controlled by motor revolution speed control. Therefore, the engine control can be performed as in the common engine control to achieve improvement of fuel economy and torque response, and to reduce degradation of emission component of the exhaust gas.

On the other hand, since motor revolution speed control is performed during the period from the time t21 to the time t23, a torque response becomes high, and response of the motor speed becomes high.

In the foregoing discussion, the electric motor performs regenerating operation. However, for example, in case of shifting down, the electric motor is operated in driving mode for controlling the torque of the electric motor.

On the other hand, in the example shown in FIGS. 8 to 12, while the control upon disengaging of the clutch from engaged condition is illustrated, similar control can be performed even upon engaging of the clutch.

Furthermore, while control is performed on the basis of the real-time value of the gear torque in the foregoing example, it is possible to perform control on the basis of the load equivalent value or variation of the revolution speed representative of the gear torque.

A switching pattern of control in FIG. 9, 10 or 12 requires various combination from the driving condition, the shifting performance demand or so forth. Therefore, share of control is switched on the basis of the real-time information. However, it is also possible to switch the share of control depending upon preliminarily set timings or so forth.

Furthermore, in order to prevent engine stalling and abrupt acceleration which are unfavorable vehicular behavior and are to be avoided, if abrupt variation of the engine revolution speed and the engine output torque, or torque representative value is detected from variation amount in a predetermined period or so forth, setting of the pattern set forth above can be released or modified.

Next, discussion will be given for control operation of the torque control unit 112 to be employed in the shown embodiment of the shift control system with reference to FIG. 13.

FIG. 13 is an explanatory illustration of the control operation of the torque control means to be employed in one embodiment of the shift control system according to the present invention.

On the side of the engine, the spark ignition timing, the fuel injection amount and the air flow rate controlled by throttle angle control are parameters for controlling the torque. Therefore, the torque control unit 112 selectively use these parameters for selective torque control.

In the shown embodiment, when demand for lowering the torque is caused, parameters to be selected depending upon the demanded torque from the control share judgment unit 154, is preliminarily stored in a form of map and table for realizing selective control. In the shown example, on the basis of the demanded torque and demand for torque control response at the time thereof, one of modes of only spark ignition timing, only fuel injection amount, a combination of the spark ignition timing and the fuel injection amount, only air flow rate, and a combination of all parameters is selected for torque control. Here, the torque control response demand may be a function taking the operation amount of the accelerator pedal by the driver within a given period, for example.

Next, operation of the motor revolution speed control unit 122 in the shown embodiment will be discussed with reference to FIGS. 14 and 15.

FIG. 14 is a block diagram showing a construction of the motor revolution speed control unit in the shown embodiment, and FIG. 15 is a timing chart of control employing the motor revolution speed control unit in the shown embodiment.

The motor revolution speed control unit 133 includes a target revolution speed difference deriving portion 122A and a generation amount deriving portion 122B. The target revolution speed difference deriving portion 122A is constructed with a target revolution speed variation pattern setting portion 122A1 and a revolution speed difference deriving portion 122A2.

Here, behavior of respective part in shifting operation in the automated M/T will be discussed with reference to FIG. 15.

FIG. 15 shows behavior of clutch condition, gear position, demanded torque, engine revolution (on the input side of the clutch) upon down-shifting (direction of lowering the gear ratio).

Before a time t31, it is assumed that the transmission is set at A speed gear position as shown in (b) of FIG. 15 and the driver performs shifting operation for shifting up to the B speed gear position at the time t31.

When the drive performs shifting operation at the time t31, the clutch disengaging operation is initiated as shown in (a) of FIG. 15. At the same time, as shown in (e) of FIG. 15, the throttle open degree is reduced. By this, blowing up of the engine upon releasing of the clutch can be suppressed. At this time, as shown in (d) of FIG. 15, a depression amount of the accelerator pedal is held constant as shown in (d) of FIG. 15. By reducing the open degree of the throttle valve 205, the engine revolution speed can be lowered as shown in (f) of FIG. 15. Also, the demanded torque is lowered as shown in (c) FIG. 15.

However, as shown by broken line in (f) of FIG. 15, when the clutch is disengaged completely, the load applied on the output shaft of the engine is removed completely to cause temporary blow up to abruptly increase the engine revolution speed due to inertia component, such as friction or so forth (X in the drawing), and subsequently lowered. Therefore, blow-up can be further reduced by control of the electric motor.

The target revolution speed variation pattern setting portion 122A1 receives information of the target revolution speed from the control share judgment unit 154 to generate the target revolution speed varying from time to time from the preliminarily stored table and map of the target revolution speed pattern depending upon an elapsed period from the shifting operation (timing of occurrence of the shifting demand). Here, there is shown an example, in which the target revolution speed variation pattern from initiation of shifting at each shift is preliminarily determined and set. The target revolution speed may also be derived arithmetically.

The revolution speed difference deriving portion 122A2 derives a target revolution speed difference ΔNE by comparing the target revolution speed derived by the target revolution speed variation pattern setting portion 122A1 and an actual engine revolution speed. For deriving the target revolution speed difference ΔNE, a simple differential method or a method, in which a gain is combined with a differential value may be employed.

The generation amount deriving unit 122B derives a generation amount of the electric motor (assuming that driving side is positive and discharging side is negative) from a preliminarily stored table or map on the basis of the target revolution speed difference ΔNE derived by the revolution speed difference deriving portion 122A2. When the revolution speed difference ΔNE is large, the generation amount is increased, and when the revolution speed difference ANE is small, the generation amount is decreased to control the electric motor toward the target revolution speed.

As a result, as shown by the solid line in FIG. 15(*f*), blow-up X can be suppressed. Therefore, by driving the electric motor according to the target evolution speed pattern as shown in FIG. 15(*g*), the control of the engine revolution speed can be performed.

Namely, by driving the electric motor disposed between the output shaft of the engine and the input shaft of the clutch, engine operation is assisted by switching operation modes of the electric motor between generation mode and driving mode so as neither to lower nor increase the engine revolution speed. By performing minimum throttle open degree control in the range where torque variation can be absorbed by performance of the electric motor, load on the engine can be reduced to avoid degradation of performance.

On the other hand, at a time t32, the clutch transit from the disengaged state to the engaged state. However, when shifting from the A speed gear position to the B speed gear position via the neutral position is completed, the throttle open degree is increased to be greater as shown in (e) of FIG. 15 to elevate the torque and the engine revolution speed as shown in (c) and (e) of FIG. 15 to start engagement of the clutch. Here, if the throttle valve open degree becomes large before sufficiently engaging the clutch, blow-up Y is caused as shown in (f) of FIG. 15 to start actual engagement of the clutch. Then, the output side of the clutch (driving wheel side) serves for lowering Z of the engine revolution speed. Such blow-up Y or lowering Z of the engine revolution speed may be decreased by controlling the generation amount of the electric motor according to the target revolution pattern.

As set forth above, there is a difference between the engine revolution speed before shifting and that after shifting, by changing the gear position. Upon disengagement and engagement of the clutch, temporary acceleration and deceleration of the engine revolution speed is unnecessarily caused. However, the shown embodiment can suppress temporary acceleration and deceleration of the engine revolution. Such temporary acceleration and deceleration of the engine revolution speed should cause driving condition of the engine offsetting from the optimal value in engine control to cause degradation of performance. However, the shown embodiment successfully avoid such problem.

In the foregoing embodiments, control on the side of the engine controls the engine torque and the control on the side of the electric motor controls the motor revolution speed. However, it is also possible to control the electric motor on the basis of the target revolution speed difference $\Delta NE$, and as shown in FIG. 14, spark ignition timing of the engine is controlled by an ignition timing control amount deriving portion 112X to improve asymptotic precision and speed to the target revolution speed.

In the embodiment shown in FIG. 14, example of target revolution speed control is discussed. However, similar control upon occurrence of torque control demand can be realized using the difference of the target torque and the actual torque or the equivalent value thereof. Here, it is possible to perform motor control in combination of the torque control.

As set forth above, by the shown embodiment, the motor control can be performed in addition to the engine control for demand for torque and the revolution speed upon shifting operation. It becomes possible to drive the engine within a range not offsetting from the optimal value derived from demand for performance to achieve fuel economy and lowering exhaust emission control performance.

Each of the engine control unit 110, motor control unit 120, clutch control unit 130, transmission control unit 140 and general control unit 150 may be realized by a conventional microcomputer. The microcomputer (not shown) includes a memory device storing data table and control programs explained by referring to the flowcharts shown in FIGS. 4, 8 and 11, input and output ports for controlling the input and output signals, a random access memory for temporarily storing processing data, a central processing unit and a bus line connecting those elements together. The memory device may be a semiconductor memory device. The semiconductor memory device may be replaced by an optical memory device or a magnetic memory device and other type of memory device which is able to record the program codes to be readout by the computer.

According to the present invention, degradation of engine characteristics upon shifting operation can be reduced and load on the clutch and the transmission due to delay of response can also be reduced.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A transmission control system comprising:
  an engine generating a driving force;
  a transmission having a plurality of gear positions for transmitting the driving force developed by said engine to driving wheels;
  a clutch for connecting said engine and said transmission;
  engine control means for controlling said engine;
  transmission control means for switching gear positions of said transmission;
  clutch control means for controlling disengagement and engagement of said clutch;
  an electric motor connected to a drive shaft of said engine and capable of performing regenerating operation;
  motor control means for controlling said electric motor for driving said electric motor for generating a driving force or for performing regenerating operation,
  said motor control means transmitting said driving force to said driving wheels upon shifting operation by said transmission and performing regenerating portion by an energy from said driving wheels.

2. A transmission control system as set forth in claim 1, which further comprises general control means for making judgment of share of operation of torque generation by said engine and torque generation by said electric motor,
  one of said engine control means and said motor control means controls one of said engine and said electric motor according to a command from said general control means.

3. A transmission control system as set forth in claim 2, wherein said general control means controls said electric motor by said motor control means when a difference between a torque demanded by a next gear position and a current gear torque is within a torque control range of said electric motor, during shifting of gear position by shifting operation.

4. A transmission control system as set forth in claim 1, wherein said motor control means derives a target revolution speed of said electric motor variable according to elapsed time after shifting and controls revolution speed of said electric motor on the basis of said target revolution speed.

5. A control system for controlling a transmission connected between an output of an engine and driving wheels, comprising:
  a regeneratable electric motor connected to an output shaft of said engine for transmitting and receiving driving force to and from said output shaft;
  motor control means for selectively controlling operation for converting a driving energy from said driving wheels into electric energy by said regeneratable electric motor; and
  transmission control means for controlling operation of transmission of a driving force of said engine to said driving wheels and operation of transmission of a driving force of said regeneratable electric motor to said output shaft of said engine.

* * * * *